United States Patent [19]

El-Saie

[11] Patent Number: 4,836,611
[45] Date of Patent: Jun. 6, 1989

[54] METHOD AND APPARATUS FOR DRILLING AND SEPARATING

[75] Inventor: Ahmed A. El-Saie, Venetia, Pa.

[73] Assignee: Consolidation Coal Company, Pittsburgh, Pa.

[21] Appl. No.: 191,455

[22] Filed: May 9, 1988

[51] Int. Cl.[4] .......................... E21F 7/00; B01D 25/38
[52] U.S. Cl. .......................................... 299/7; 55/199; 55/206; 210/414; 210/415
[58] Field of Search ................ 299/2, 7, 12; 210/188, 210/413, 414, 415, 196, 345; 55/199, 206

[56] References Cited

U.S. PATENT DOCUMENTS 1,229,839  6/1917  Wedge .......................... 210/415 X

FOREIGN PATENT DOCUMENTS 1064032  5/1954  France .............................. 210/415
1127258  9/1968  United Kingdom ................ 210/414
1342998  1/1974  United Kingdom ................. 299/12

Primary Examiner—Jerome W. Massie, IV
Assistant Examiner—David J. Bagnell
Attorney, Agent, or Firm—Alan N. McCartney

[57] ABSTRACT

A combination borehole drilling apparatus and a separator for receiving a three phase gas, liquid and solid mixture, from the borehole, and venting the gas, separating the liquid from the solid, collecting and discharging the solid and recycling the liquid to the borehole drilling apparatus.

6 Claims, 2 Drawing Sheets

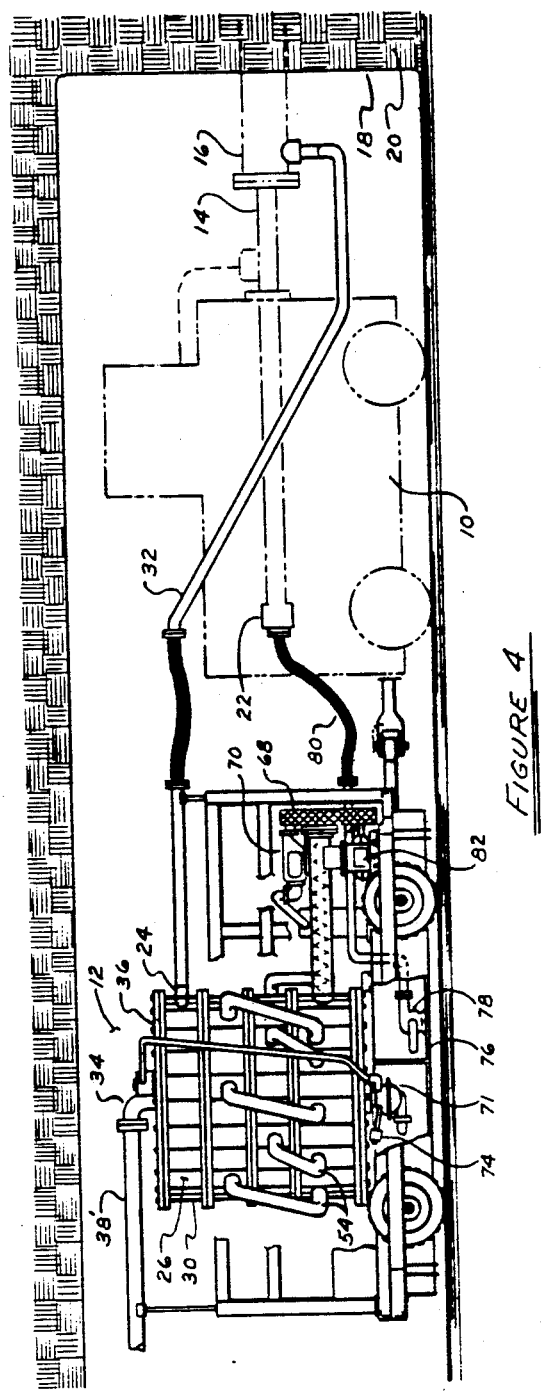

METHOD AND APPARATUS FOR DRILLING AND SEPARATING

BACKGROUND OF THE INVENTION

Field of the Invention

Method and apparatus for drilling and separating including a rotary separator having a plurality of horizontal stacked separation stages for separating solids, liquids and gases in a three phase mixture. The primary use is for separating the pressurized mixture of gas, coal and water produced during horizontal drilling for degasifying coal seams, and to recycle the water to the drill pipe, vent the gas to the surface and collect the coal.

SUMMARY OF THE PRIOR ART

In the art of separating different sizes or grades of material from a material batch, there are stacked horizontal screens with adjacent outlets for collection of the different size or grades of material. U.S. Pat. Nos. 1,536,124 and 2,992,740 illustrate this type of separator. Other separators such as shown in U.S. Pat. Nos. 672,248 and 1,024,249 utilize brushes or vanes passing over a separating screen to assist in separating different size materials or a solid from a liquid.

SUMMARY OF THE INVENTION

Prior to mining a coal seam, horizontal boreholes are drilled into the seam face to exhaust the entrapped methane gas to make the mining operation safer. In normal practice, the mixture of gas, coal and water removed from the borehole is passed into a settling tank. Only the gas is separated from the coal and water and the coal and water remains in a settling tank and is periodically discharged.

It is the purpose of this invention to provide a portable rotary separator for use with a coal seam horizontal drill. The separator will continuously separate the pressurized three phase mixture of gas, coal, and water, vent the gas to the surface, collect the coal and recycle the water to the drill. This separator operates continuously, is more efficient, less expensive and rapidly separates the three phase mixture.

It is an object of this invention to provide a rotary separator having a plurality of vertically stacked cylindrical separation stages, with provision for removal of the gas from the liquids and solids at an intake separator stage. Each separator stage has a filter screen for separating the liquid from the solid with progressively offset openings in each filter screen to pass the solid to the next stage. A wiper in each stage rakes the solid across the screen to facilitate solid-liquid separation. The liquid passes through the screen in the intake separation stage and onto a conical plate and out a plurality of openings in the side of the separator. The openings of each stage are interconnected to a lowermost reservoir stage having a central opening for disposal of the liquid. The opening in the screen in the last stage is above an auger which collects the solid (coal) for disposal.

It is a further object of this invention to provide a rotary separator having a plurality of vertically stacked cylindrical separating stages, the first of which is adapted to separate a gas from a liquid-solid pressurized mixture with subsequent stages separating the liquid from the solid and a last reservoir stage for separately removing the liquid and the solid from the separator. The liquid separated from the solid in one stage passes through a screen and onto a solid conical collector in the next stage and then passes to the reservoir stage. Each liquid/solid separation stage has wipers that rake the solids across the screens. The screens and conical collectors have solids discharge openings for transfer of the solids to the next stage, with the solids discharge openings between stages being staggered, maximizing the screening and thus liquid-solids separation. The reservoir stage includes a solids collector under the solids discharge opening in the last liquid/solid separation stage and permits removal of the solids from the separator.

It is another object of this invention to provide a method and apparatus for degasifying a coal seam by connecting a separator to the drill stem to separate the pressurized three phase coal, water and gas mixture received from the drill stem, vent the gas to the surface, separate the coal from the water, collect the coal and recycle the water to the drill stem.

This is a companion application to commonly owned U.S. patent application Ser. No. 191,456 filed May 9, 1988 concurrently filed herewith.

BRIEF DESCRIPTION OF THE DRAWINGS

FIG. 4 is a side elevational view illustrating the drilling apparatus and separator combination of this invention.

DESCRIPTION OF THE PREFERRED EMBODIMENTS

Figure 1:
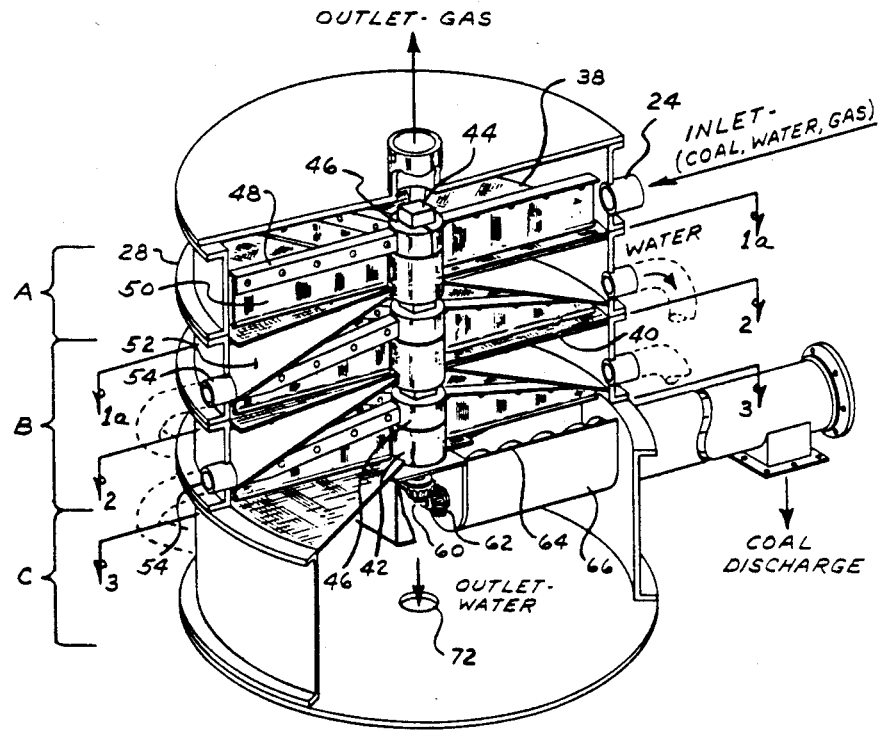
FIG. 1 is a cut-away sectional view of the separator of this invention.

The general arrangement of a horizontal drilling apparatus 10 and a separator 12 is illustrated in FIG. 4. The mobile drilling apparatus 10 has a drill stem 14 which passes into a casing 16 in the face 18 of the coal seam 20. Water is passed into the drill stem 14 through line 22 and the coal, water and gas collected during the drilling operation passes around the drill stem 14 and is collected out of the casing 16.

Positioned behind the drilling apparatus 10 is a mobile separator 12 which separates the liquid, solid and gas, vents the gas to the surface, collects the coal and recycles the water to the drill stem. The separator 12 (See FIG. 1) comprises an intake stage (A), a liquid-solid separator stage (B) and a reservoir stage (C). Each stage comprises a cylindrical housing or segment 26 of the separator. The housings each have flanges 28 through which tie rods 30 are secured to interconnect the stacked housings (see FIG. 4) to form an enclosed pressurized container.

The intake 24 at intake stage A is connected through line 32 to the casing 16 in the mine face to receive the three phase mixture. The gas is vented through opening 34 in the top 36 of the separator and is transported to the surface through line 38' (see FIG. 4). Positioned between each housing is a screen 38 carried on supports 40. The supports 40 each carry centrally located bearings 42 through which rotatable shaft 44 is positioned. The shaft 44 has collars 46 carrying a plurality of outwardly extending supports 48 to which vanes or wipers 50 are attached. The wipers 50 rake the coal across the screen as the shaft 44 is rotated.

Figures 1A, 2, 3:
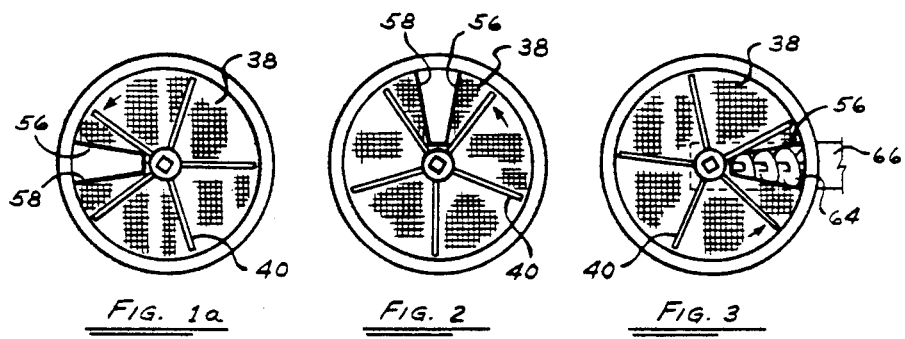
FIG. 1a is a sectional view taken along the line 1a—1a of FIG. 1.
FIG. 2 is a sectional view taken along the line 2—2 of FIG. 1.
FIG. 3 is a sectional view taken along the line 3—3 of FIG. 1.

In each liquid-solid separator stage (B) there is positioned conical collector 52 which transfers the liquid downward and outward toward a plurality of outlets 54 in each stage, with the lines from each outlet being connected to the reservoir stage (C) where the water is collected. The screens 38 and fluid collector 52 have vertically aligned discharge openings 56, 58, respectively, permitting the coal to drop from one stage to another. The openings 56, 58 of one stage are vertically offset from the preceding stage to maximize the amount of screening time of each stage (see FIGS. 1a, 2 and 3). It should also be noted that the supports 48 in the liquid-solid separation stage are angularly disposed to conform to the under conical surfaces of collector 52.

The lower end of shaft 44 carries a miter gear 60 engaging miter gear 62 on the auger 64. The opening 56 in the last screen is located above the auger 64 so that the coal can be transported down trough 66 for collection. The auger is driven through the chain 68 by hydraulic motor 70 (thus driving the shaft 44 of the separator).

A valve 71 is positioned below the opening 72 in the reservoir and has a weighted diaphragm. When sufficient head pressure is developed from the liquid collected in the reservoir to overcome the weight 74, the diaphragm (not shown) will open the valve dumping the liquid into the pan 76. As the water is discharged to the tank and head pressure of the water in the reservoir is lowered, the weight 74 closes the valve. A pump 78 in the line 80 passes the water into the drill stem as required during the drilling operation. (The particular valve involved is made by Kimray Inc., however, any conventional pressure responsive valve can be utilized to maintain a fluid level in the separator reservoir and to prevent the gas from escaping with the liquid).

A Roto-Flo ® heavy duty air lock feeder 82 is located below the end of trough 66 to collect the coal and is driven by chain 68 to dump the collected coal on the mine floor and prevent any gas from escaping during the solids discharge (see FIG. 4).

It should be noted that the combination drilling apparatus and separator is illustrated in a coal seam degasification environment, however, it is clearly contemplated to be within the scope of this invention that this equipment can be used in other applications where it is desirable to separate the solids, liquids and gases from the pressurized three phase mixture of debris. For example, it is contemplated that the method and apparatus can be used in areas where no gas is produced and a mixture of solids and liquids are produced. In such a situation, the primary purpose would be to separate liquids from solids.

I claim:

1. Apparatus for developing a borehole and separating a liquid and solid mixture collected from the borehole comprising:
    (a) a drilling machine for drilling a borehole and removing at least the solid and liquid from the borehole;
    (b) a separator for receiving the solid and liquid mixture from the drilling machine;
    (c) said separator including a housing with an upper portion having a first intake stage for receiving the mixture; a second separator stage for separating the solid from the liquid and a third reservoir stage for separately collecting the liquid and the solid;
    (d) means to transport the collected liquid to the drilling machine for recycling;
    (e) means to discharge the collected solids from said separator;
    (f) said housing includes a plurality of vertically stacked interconnected cylindrical segments with each separating stage being located in one of said segments;
    (g) horizontal screens positioned between each of said segments, each of said segments having liquid outlets connected to said reservoir stage; and
    (h) each of said screens having solids discharge outlets, the outlet of one screen being vertically staggered from the outlet in the adjacent screen.

2. The apparatus of claim 1 including conical liquid collectors in said separator stage transferring the liquid to said outlets, said collectors having solids discharge outlets below the discharge outlet of the preceding screen.

3. The apparatus of claim 2 including a rotary shaft supported centrally of said housing and carrying vanes for raking the solids across said screens.

4. The apparatus of claim 3 including an auger in said reservoir stage for collecting and transporting the solids from the apparatus.

5. The apparatus of claim 4 including an air lock feeder at the discharge of said auger to prevent gas from escaping during the solids discharge.

6. Apparatus for developing a borehole and separating a liquid, solid and gas mixture collected from the borehole comprising:
    (a) a drilling machine for drilling a borehole and removing at least the solid and liquid from the borehole;
    (b) a separator for receiving the solid and liquid mixture from the drilling machine;
    (c) said separator including a housing with an upper portion having a first intake stage for receiving the mixture; a second separator stage for separating the solid from the liquid and a third reservoir stage for separately collecting the liquid and the solid;
    (d) means to transport the collected liquid to the drilling machine for recycling;
    (e) means to discharge the collected solids from said separator;
    (f) said transport means is a feed line having a pump for transporting the liquid from the reservoir to said drilling machine; and
    (g) a control valve in said line responsive to the head of liquid in said reservoir to pass the liquid to said line and maintain constant liquid level in the reservoir to prevent the gas from escaping with the liquid discharge.

* * * * *